W. SAUERBREY.
GOVERNOR COCK FOR STEAM HEATERS OR THE LIKE.
APPLICATION FILED JULY 24, 1920.
1,412,138.
Patented Apr. 11, 1922.
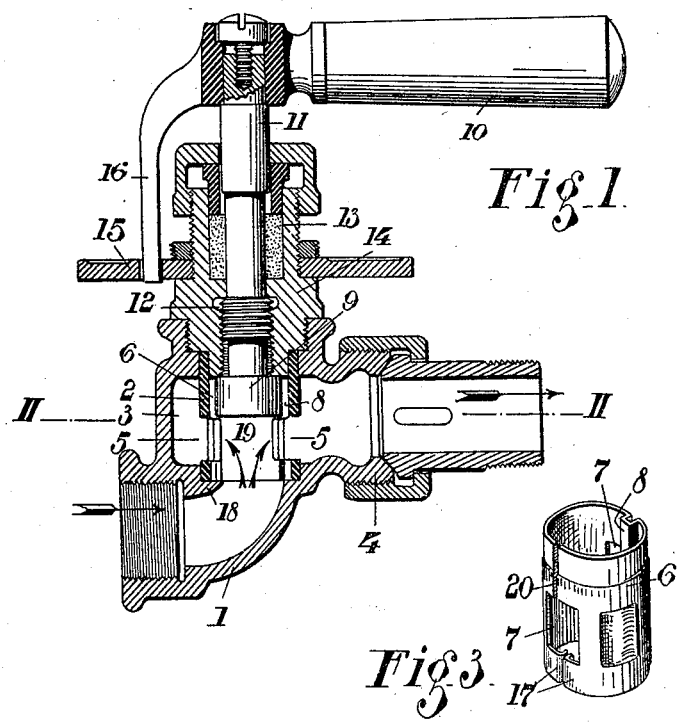
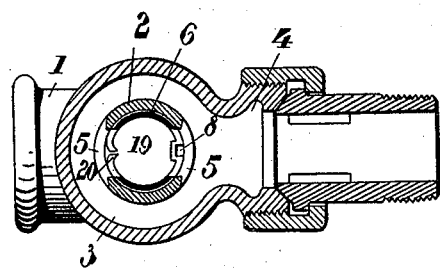
Witnesses
Inventor:
Wilhelm Sauerbrey,
By his Atty,

UNITED STATES PATENT OFFICE.

WILHELM SAUERBREY, OF BERLIN-TREPTOW, GERMANY.

GOVERNOR COCK FOR STEAM HEATERS OR THE LIKE.

1,412,138.

Specification of Letters Patent. Patented Apr. 11, 1922.

Application filed July 24, 1920. Serial No. 398,839.

(GRANTED UNDER THE PROVISIONS OF THE ACT OF MARCH 3, 1921, 41 STAT. L., 1313.)

*To all whom it may concern:*

Be it known that I, WILHELM SAUERBREY, a citizen of Germany, and resident of Berlin-Treptow, Germany, have invented certain new and useful Improvements in Governor Cocks for Steam Heaters or the like, (for which I have filed applications in Germany, July 27, 1918, and Oct. 29, 1918;) and I do hereby declare the following to be a full, clear, and exact description of the invention, such as will enable others skilled in the art to make and use the same.

This invention relates to a governor cock, in particular for steam heaters and the like, excelling over and above the known form of cocks of this kind, while possessing the like passage area by its being considerably lighter in weight, in particular as regards the necessary brass and red brass parts thereof, by its greater resisting power, its ease of working, and cheap and easy method of construction, while possessing at least the same degree of efficiency.

This improved cock is fitted out like the hitherto customary governing cocks for heaters with a hollow plug, the internal space of which communicates in an axial sense with one of the openings formed in the box or casing of the cock, and in a radial sense with the other opening thereof. In accordance with my invention, there is further provided a special bush or liner surrounding the plug, and serving to so shut off or separate the axially disposed opening of the box from the radially disposed opening thereof that an annular conduit, communicating with the latter opening, is caused to be formed around the plug. The bush or liner is provided in its wall section with symmetrically disposed, preferably rectangular openings, one of which in the preferred form of my invention is lodged opposite the inlet of the radially disposed aperture in the annular conduit. The plug, which has the shape of a longitudinally slotted tubular sleeve, is provided with corresponding openings or passages.

The aforesaid improved cock structure offers the possibility of employing iron for the main parts, especially for the entire box or casing, since red brass will only be required for the packing surfaces and any other parts in mutual frictional connection. By these means, the cock may be produced at a very low cost, and it may also be repaired at a slight expense by simply renewing the box, respectively the bush or liner. Moreover, the improved cock will be found to be far more capable of resisting any violent stress, such as it becomes subject to when fitted up, and which is liable to cause dints in the sides of the box of cocks of the type hitherto employed, and therewith deformations of the packing surfaces and a jamming of the plug.

An embodiment of the subject matter of my invention is shown by way of example in the accompanying drawing, in which Fig. 1 is a vertical section of the improved cock structure, Fig. 2 a cross section on line II—II in Fig. 1, and Fig. 3 a perspective view, on a somewhat larger scale, of the plug.

In the following description the subject matter of this invention is shown in connection with an ordinary cock, in which the inlet and outlet pipe sockets are disposed in one and the same direction. It is obvious, however, that the invention is equally applicable to angle valves.

Within the box or casing 1, made of cast iron, preferably malleable cast iron, there is fitted in from above the sleeve 2, consisting of a red brass tube section. The sleeve is secured in its place by being suitably forced-in. The sleeve 2, which with its lower end reposes on a corresponding projection 18 of the box, constitutes, along with the respective parts of the wall of the box, an annular conduit 3, communicating with the bore formed in the outlet pipe 4. Communication with the axially disposed hollow space 19, which is in communication with the inlet opening, is established by aid of two rectangular openings 5 of the bush or liner 2, arranged diametrically opposite to each other, and one of which is disposed opposite to the outlet opening of the pipe socket 4. Within the liner or bush 2 there is inserted the plug 6, the structure of which is shown in Fig. 3. The plug is likewise made of red brass, and constitutes a longitudinally slotted tubular sleeve, provided with two apertures 7, corresponding to the openings 5 of the bush or liner, and a ledge-like recess 8 disposed opposite to slot 20. This recess, which preferably is formed by pressing-in the wall of the sleeve, is adapted to engage a corresponding groove formed in the piston 9, surrounded by the plug, and which piston is connected to the stem 11 supporting the key 10 at its top end. This piston is adapted to move down from the position shown in Fig. 1 until it abuts the stop formed by the laps 17 referred to later. The stem or spindle 11, which may be of iron, is provided with a threaded portion 12, adapted to engage a corresponding internally threaded portion of the screw coupling 14 supporting the stuffing box 13. Provided the stem or spindle 11 be made of iron, then the threaded portion is preferably constructed as a separate threaded brass ring which is forced on to the said stem. The screw coupling 14 in addition supports the index plate 15 of known construction within the annular slot of which the index 16 is adapted to move. The end walls (not shown) of the slot of the index plate 15 constitute stops to limit the movement of the index 16, so that the shaft 11 which is rigidly secured to the index, and the piston 9 mounted on said shaft, and the hollow valve or plug 6 engaging therewith can only be rotated to an extent corresponding to the length of the slot. The length of the slot is such that during the entire extent of the rotation of the hollow valve or plug 6 connected to the shaft 11 the apertures 7 of the valve will register, at least partially with the apertures 5 of the outer bush or sleeve 2. The position of the piston 9 with relation to the apertures 7 of the valve 6 governs the maximum sectional area of the passage of the cock. If it is desired to modify this maximum passage area the shaft 11 after removal of the handle 10 is screwed down more or less, whereby the apertures 7 are covered by the piston 9 more or less, the free passage area being thereby correspondingly reduced.

The longitudinal slot 20 of the plug passes through one of the apertures 7. The two laps 17 of the tube section, or plug formed at the underside of the respective aperture, are bent inward in order to form an abutment for the piston when axially shifted within the bush 2. This movement of the piston serves to regulate the maximum width of passage of the cock in true correspondence with the maximum consumption of fuel required on the part of the respective heater. This said width or area is, after the key 10 has been removed, once for all adjusted by suitably screwing down the stem 11.

The particular position of the openings 5 of the bush or liner 2 relatively to the mouth of the outlet opening formed in the annular conduit 3, is intended to prevent one of the openings being closed by water of condensation collecting in the said annular conduit, in the event of the cock being arranged horizontally. The construction of the plug in the manner of a resilient tubular sleeve is bound to secure specially easy working, while the packing thereof will always prove satisfactory. Moreover, this peculiar and novel form of construction facilitates the operation of grinding in the plug.

Of the various parts of the cock all, with the exception of bush or liner 2, plug 6, piston 9, and threaded section 12, may be readily formed of iron, without thereby in any way impairing the efficiency of the device. However, and as will be obvious, the cock itself may also be constructed in a different manner, without thereby departing from the spirit of my invention. Thus, for example, the liner 2 may, particularly in case the box is shaped to constitute an angle valve as aforementioned, also be inserted from below; in which event the cover 14 might be made integral with the box.

What I claim is:

1. A governor cock, in particular for steam heaters, comprising a casing having inlet and outlet conduits; a bush inserted in said casing in such a manner that an annular space is caused to be formed between the outer face of the bush and the wall of the casing; said annular space communicating with one of said conduits, and the inner space of said bush with the other of said conduits; an opening in said bush communicating with said annular space; a hollow valve inserted in said bush and adapted to be rotated therein, means for limiting the rotation of said valve; an aperture formed in the wall portion of said valve corresponding to the opening in said bush and adapted to establish communication between the annular space and said other of said conduits during the whole rotation of said valve within said limiting means; and means for operating said valve.

2. A governor cock, in particular for steam heaters, comprising a casing having inlet and outlet conduits; a bush in said casing between which and the wall of the casing is formed an annular space; said annular space communicating with one of said conduits, and the interior of said bush communicating with the other of said conduits; an opening in said bush communicating with said annular space; a valve having the form of a hollow cylinder inserted in said bush, and adapted to be rotated therein; an aperture formed in the wall portion of said valve corresponding to the opening in said bush and adapted to establish communication between the annular space and said other of said conduits; means for operating the valve comprising means for regulating the maximum passage area of said openings by varying their dimensions in an axial direction.

3. A governor cock, in particular for steam heaters, comprising a casing having inlet and outlet conduits; a bush in said casing between which and the wall of the casing is formed an annular space; said annular space communicating with one of said conduits, and the interior of said bush communicating with the other of said conduits; an opening in said bush communicating with said annular space; a valve having the form of a hollow cylinder inserted in said bush, and adapted to be rotated therein; an aperture formed in the wall portion of said valve corresponding to the opening in said bush and adapted to establish communication between the annular space and said other of said conduits; means for operating the valve comprising a piston, displaceable in an axial sense within the valve, and adapted to cover the openings formed in the valve to a greater or less extent.

4. A governor cock, in particular for steam heaters, comprising a casing having inlet and outlet conduits; a bush in said casing between which and the wall of the casing is formed an annular space; said annular space communicating with one of said conduits, and the interior of said bush communicating with the other of said conduits; an opening in said bush communicating with said annular space; a valve having the form of a hollow cylinder inserted in said bush, and adapted to be rotated therein; an aperture formed in the wall portion of said valve corresponding to the opening in said bush and adapted to establish communication between the annular space and said other of said conduits; means for operating the valve comprising a threaded spindle, adapted to be shifted by rotation in an axial direction, and a piston fixed to said spindle adapted to partially cover said apertures and being coupled to said valve so as to allow an axial shifting relatively to said valve.

5. A governor cock, in particular for steam heaters, comprising a casing having inlet and outlet conduits; a bush in said casing between which and the wall of the casing is formed an annular space; said annular space communicating with one of said conduits, and the interior of said bush communicating with the other of said conduits; an opening in said bush communicating with said annular space; a valve having the form of a hollow cylinder inserted in said bush, and adapted to be rotated therein; an aperture formed in the wall portion of said valve corresponding to the opening in said bush and adapted to establish communication between the annular space and said other of said conduits; and means for rotating said valve comprising a threaded spindle co-operating with an internal threaded portion of the body of the cock and provided at its lower end with a piston-shaped head fitting in the hollow space of said valve and adapted, on being rotated, to rotate the valve and execute an axial shift relatively to the valve.

6. A governor cock, in particular for steam heaters, comprising a casing having inlet and outlet conduits; a bush in said casing between which and the wall of the casing is formed an annular space; said annular space communicating with one of said conduits, and the interior of said bush communicating with the other of said conduits; an opening in said bush communicating with said annular space; a valve having the form of a hollow cylinder inserted in said bush, and adapted to be rotated therein; an aperture formed in the wall portion of said valve corresponding to the opening in said bush and adapted to establish communication between the annular space and said other of said conduits; and means for rotating said valve comprising a threaded spindle co-operating with an internally threaded portion of the body of the cock and provided at its lower end with a piston shaped head fitting in the hollow space of said valve, said head being connected to the valve by means of a groove and tongue arrangement.

7. A governor cock, in particular for steam heaters, comprising a casing having inlet and outlet conduits; a bush in said casing between which and the wall of the casing is formed an annular space; said annular space communicating with one of said conduits, and the interior of said bush communicating with the other of said conduits; an opening in said bush communicating with said annular space; a valve constituting a longitudinally slotted sleeve of resilient material being rotatably, but not shiftably in axial direction inserted in said bush; an aperture formed in the wall portion of said sleeve corresponding to the opening in said bush and adapted to establish communication between the annular space and said other of said conduits; and means for operating said valve.

8. A governor cock, in particular for steam heaters, comprising a casing having inlet and outlet conduits; a bush in said casing between which and the wall of the casing is formed an annular space; said annular space communicating with one of said conduits, and the interior of said bush communicating with the other of said conduits; a plurality of openings in said bush communicating with said annular space; a valve consisting of a resilient metal sleeve being inserted in said bush and adapted to establish communication between the annular space and said other of the conduits, by means of openings formed in the sleeve in correspondence to the opening in said bush, said sleeve provided with a longitudinal slot passing through one of the valve openings, the section of the wall of said sleeve adjacent to said slot being bent inwardly to form projections extending to the interior of the sleeve; and means for rotating said valve.

9. A governor cock, in particular for steam heaters, comprising a casing having inlet and outlet conduits; a bush in said casing between which and the wall of the casing is formed an annular space; said annular space communicating with one of said conduits; two openings arranged diametrically opposite to each other in said bush and communicating with said annular space; a valve having the form of a sleeve inserted in said bush and adapted to rotate therein, but not to be moved in an axial direction; apertures formed in the wall portion of said valve, said apertures corresponding to the openings in said bush and adapted to establish communication between the annular space and the other of said conduits; one of said openings being arranged opposite to the one of said conduits communicating with said annular space.

10. A governor cock, in particular for steam heaters, comprising a casing having inlet and outlet conduits; a bush inserted in said casing in such a manner that an annular space is caused to be formed between the outer face of the bush and the wall of the casing; said annular space communicating with one of said conduits, and the inner space of said bush with the other of said conduits; an opening in said bush communicating with said annular space; a hollow cylindrical valve inserted in said bush and adapted to be rotated but not to be axially shifted therein; an aperture formed in the wall portion of said valve corresponding to the opening in said bush and adapted to establish communication between the annular space and said other of said conduits; means for varying the maximum passage area of said aperture and said opening; and means for rotating said valve.

11. A governor cock, in particular for steam heaters, comprising a casing having inlet and outlet conduits; a bush inserted in said casing in such a manner that an annular space is caused to be formed between the outer face of the bush and the wall of the casing; said annular space communicating with one of said conduits, and the inner space of said bush communicating with the other of said conduits; an opening in said bush communicating with said annular space; a hollow cylindrical valve inserted in said bush and adapted to be rotated but not to be axially shifted therein; an aperture formed in the wall portion of said valve corresponding to the opening in said bush and adapted to establish communication between the annular space and said other of the conduits; and means for rotating said valve; said rotating means comprising a threaded spindle co-operating with an internal threaded portion of the body of the cock and provided at its lower end with a piston-shaped head fitting in the hollow space of said valve and adapted, on being rotated, to rotate the valve and execute an axial shift relatively to the valve.

In testimony whereof I affix my signature in the presence of two witnesses.

WILHELM SAUERBREY.

Witnesses:
WILH. RUHLMANN,
WILHELM HAGREWE.